Jan. 12, 1943.                H. BANCROFT                2,308,148
                           SHEET METAL CUTTER
                           Filed May 20, 1942         2 Sheets-Sheet 2
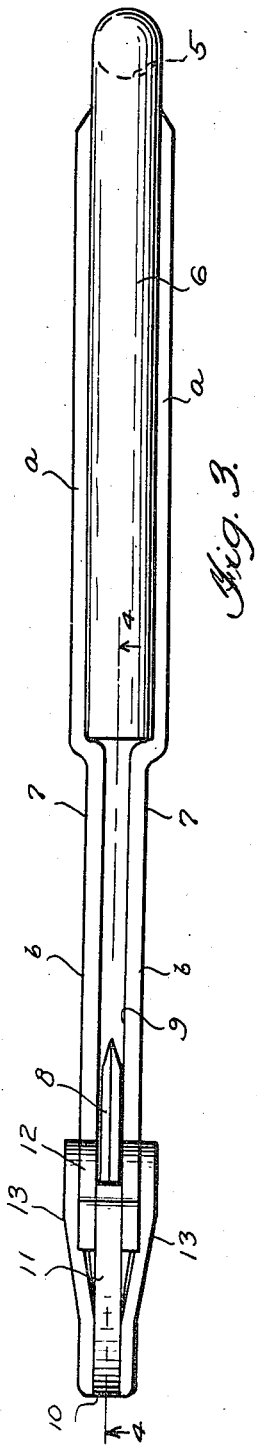
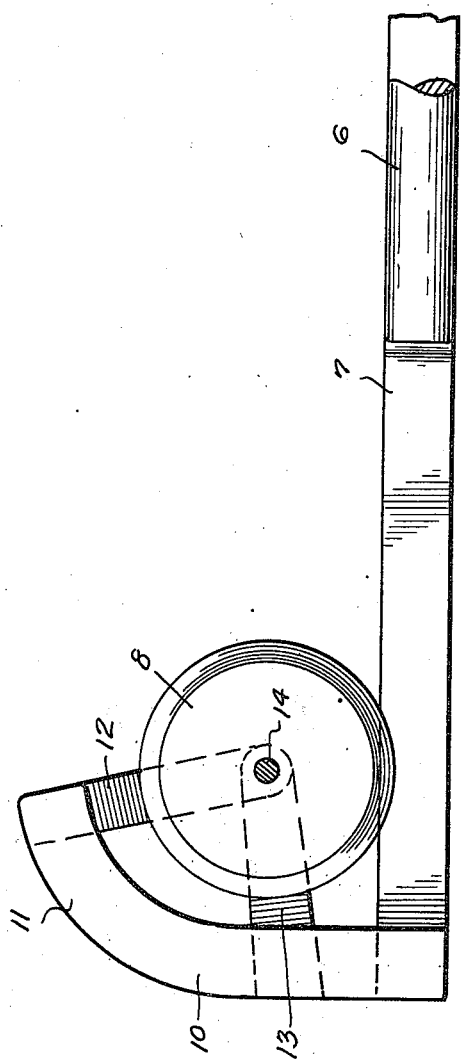
Inventor
HOWARD BANCROFT Patented Jan. 12, 1943

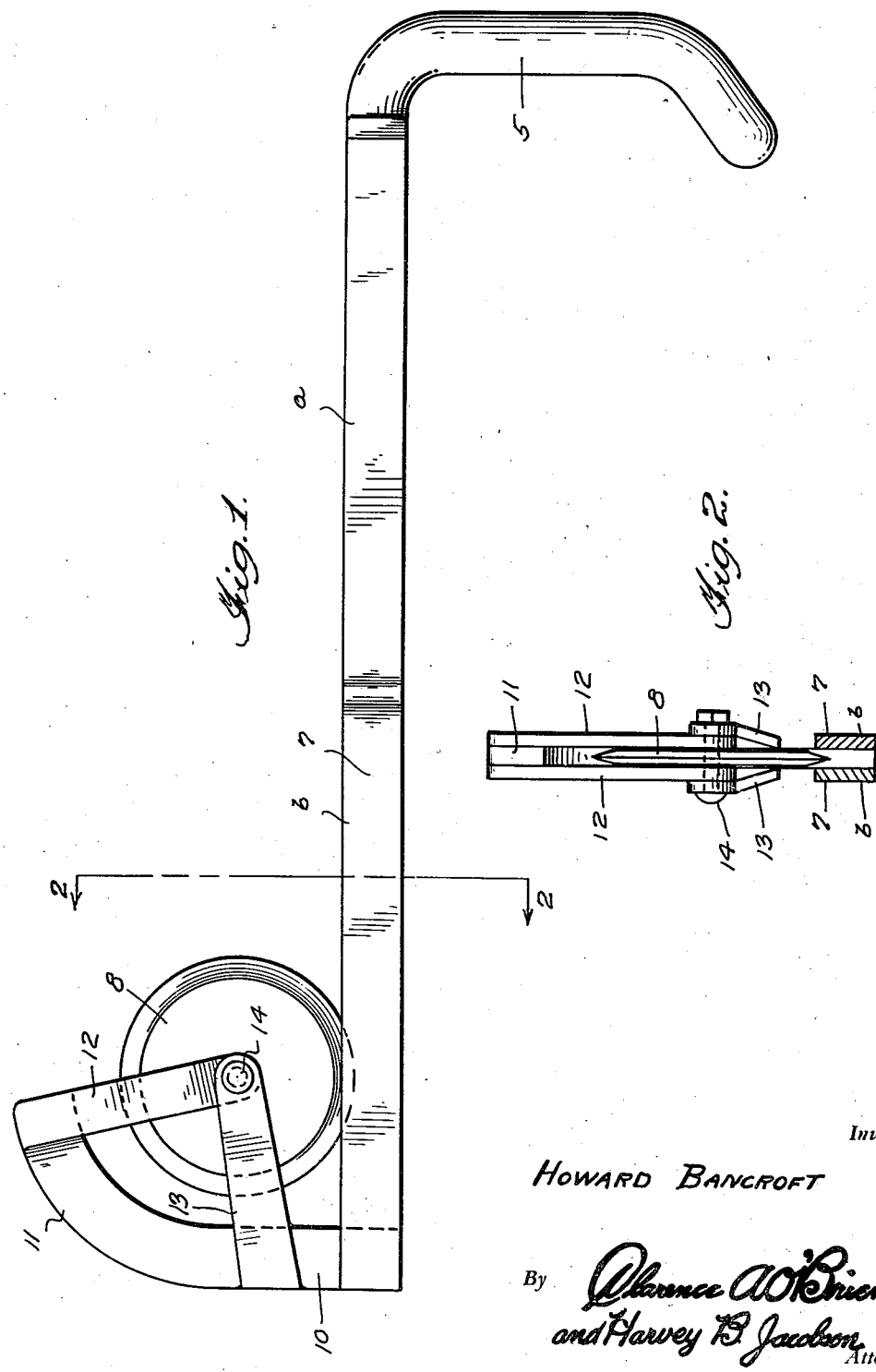

2,308,148

UNITED STATES PATENT OFFICE 2,308,148

SHEET METAL CUTTER

Howard Bancroft, Bagley, Iowa

Application May 20, 1942, Serial No. 443,809

2 Claims. (Cl. 30—263)

This invention relates to new and useful improvements in cutting implements and more particularly to a cutter for quickly and efficiently cutting sheet metal.

The principal object of the present invention is to provide a cutting implement for the speeding up of sheet metal cutting which is operated in a drawing movement by the operator to the extent that the action of cutting is much more rapid and the result more efficient than is attainable through the use of present-day implements.

Other objects and advantages of the invention will become apparent to the reader of the following description.

In the drawings:

Figure 1 represents a side elevational view.

Figure 2 is a cross section on the line 2—2 of Figure 1.

Figure 3 is a top plan view.

Figure 4 is a fragmentary sectional view taken substantially on the line 4—4 of Figure 3.

Referring to the drawings wherein like numerals designate like parts, it can be seen that numeral 5 denotes a handle depending from one end of a bar 6.

Numerals 7, 7 denote a pair of strap members having offset end portions $a$, $a$ which overlap opposite side portions of the bar 6 and these offset portions $a$, $a$ are suitably secured to the bar 6 as by welding.

The remaining portions $b$, $b$ of the straps 7, 7 are closer together and define a cutting slot in complement with a cutting disk 8 which operates partly in this slot which is denoted by numeral 9.

Between the free end portions of the portions $b$, $b$ of the straps 7, 7 is one end of a leg 10 which is preferably secured as by welding to the straps 7, 7. This leg has a curved outer end portion 11 from which depends a pair of members 12, 12, one from each side thereof, while extending inwardly from the leg 10 adjacent the inner end thereof are short strap members 13 which at their outer ends interlap the adjacent ends of the members 12. These interlapping ends have registering openings to receive a short pin or shaft 14 on which is located the cutter disk 8.

The edge of a sheet of metal is placed over the implement and between the cutting disk 8 and the straps 7, 7. The implement is grasped by the handle 5 and pulled and obviously the disk 8 performs a cutting action on the sheet material.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A cutter of the character described comprising a handle, an elongated slotted member extending from the handle, a bracket structure mounted at one end of the slotted structure, a cutting disk mounted on the bracket structure and having its edge portion operating in the slot of the slotted structure, said bracket structure comprising a leg extending laterally from the slotted structure and short strap members extending from the leg and between which the said disk is mounted.

2. A cutter of the class described comprising a handle, an elongated slotted member extending from said handle, a cutting disk, and means to mount said disk on said member with the cutting edge thereof projecting into said slot comprising a bracket including a leg extending laterally from said member and curving toward the handle, and a pair of right angularly related strap members extending from the leg on each side thereof and between the leg and handle, said disk being rotatably supported by said pairs of straps between the same.

HOWARD BANCROFT.